(12) United States Patent
Lee et al.

(10) Patent No.: US 7,797,604 B2
(45) Date of Patent: Sep. 14, 2010

(54) CODEWORD AUTOMATIC REPEAT REQUEST/DECODING METHOD AND TRANSMISSION/RECEPTION APPARATUS USING FEEDBACK INFORMATION

(75) Inventors: Sang-Hyun Lee, Daejeon (KR); Yong-Tae Kim, Gongju (KR); In-Sook Park, Daejeon (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 949 days.

(21) Appl. No.: 11/635,791

(22) Filed: Dec. 8, 2006

(65) Prior Publication Data
US 2007/0136633 A1 Jun. 14, 2007

(30) Foreign Application Priority Data
Dec. 8, 2005 (KR) .................. 10-2005-0119873
May 9, 2006 (KR) .................. 10-2006-0041352

(51) Int. Cl.
*H04L 1/18* (2006.01)
(52) U.S. Cl. .................. 714/748; 714/755; 714/758
(58) Field of Classification Search .................. 714/748, 714/751, 755, 758
See application file for complete search history.

(56) References Cited

U.S. PATENT DOCUMENTS

| | | | | |
|---|---|---|---|---|
| 5,491,688 A | * | 2/1996 | Bocci et al. | 370/479 |
| 6,671,849 B2 | * | 12/2003 | Tripathi et al. | 714/746 |
| 6,700,867 B2 | * | 3/2004 | Classon et al. | 370/216 |
| 7,093,184 B2 | * | 8/2006 | Kim et al. | 714/789 |
| 7,379,434 B2 | * | 5/2008 | Moulsley et al. | 370/318 |
| 7,522,668 B2 | * | 4/2009 | Horiguchi | 375/241 |
| 7,539,207 B2 | * | 5/2009 | Frederiksen et al. | 370/465 |

FOREIGN PATENT DOCUMENTS

| | | |
|---|---|---|
| JP | 2002-319993 | 10/2002 |
| KR | 2002-0079790 | 10/2002 |
| KR | 1020020096197 | 12/2002 |
| KR | 1020040026231 | 3/2004 |
| KR | 1020040037471 | 5/2004 |
| KR | 1020050097892 | 10/2005 |
| WO | WO2004/017557 | 2/2004 |
| WO | WO2004/075023 | 9/2004 |

* cited by examiner

*Primary Examiner*—Esaw T Abraham
(74) *Attorney, Agent, or Firm*—Lowe Hauptman Ham & Berner LLP

(57) ABSTRACT

A codeword retransmission/decoding method and transmission/receiving apparatus uses feedback information. When a failure to decode data received from a receiving node occurs, the feedback information including success/failure information of the decoding and retransmission information are transmitted to a transmission node. The retransmission feedback information is configured by the receiving apparatus repeating code-bits of the codeword just previously transmitted so as to demodulate the retransmission part.

12 Claims, 10 Drawing Sheets

Receiving apparatus

CODEWORD AUTOMATIC REPEAT REQUEST/DECODING METHOD AND TRANSMISSION/RECEPTION APPARATUS USING FEEDBACK INFORMATION

BACKGROUND OF THE INVENTION (a) Field of the Invention

The present invention relates to a codeword retransmitting/decoding method and transmitting/receiving apparatus using feedback information. More particularly, the present invention relates to a codeword retransmitting/decoding method and transmitting/receiving apparatus for requesting data retransmission and correcting an error using feedback information when data are erroneously transmitted.

(b) Description of the Related Art

In a cellular communication system, zones are divided into a plurality of cells. Each cell includes at least one or more base stations.

In each cell, a base station communicates with a plurality of mobile terminals, and connects a base station-included wireless network to each mobile terminal.

Communication between the base station and a terminal is achieved by dividing a great deal of data through traffic packets.

For such communication between the base station and the terminal, the packet data must be recoverable when a data error occurs on a wireless link.

A technology for correcting such a digital data transmission error may include an error correcting code.

The error correcting code is configured by adding a residue of bits according to error correction rules to an original code when the original code has the error at the bits thereof.

The error correcting code includes a low density parity check (LDPC) code and a turbo code. The LDPC code is a code in which the number of other numbers excluding 0 is smaller in comparison with a length of the code in a parity check matrix. The turbo code is a code which is generated using a combination of two or more convolution codes.

When there is an error in information bits included in a new code transmitted through the error correcting code, a transmission node or receiving node requests an additional resource to the packet data and transmits additional information for the respective information.

Accordingly, it is determined whether the additional information is needed and requested. Such additional information transmission is referred to as an automatic repeat request (ARQ).

The ARQ is for the transmission node or receiving node to detect a data error generated in a communication channel, and to request data retransmission and to correct the data error when the packet data include an error.

The transmission node (base station or terminal) sequentially transmits buffered packet data to the receiving node (terminal or base station) when using a radio resource. When the receiving node determines that there is lost packet data in the received packet data, the receiving node generates a data retransmission request massage of the loss packet data and transmits the same to the transmission node.

When the transmission node receives the data retransmission request message from the receiving node, it retransmits a part of the lost packet data and the related data thereto to the receiving node.

Generally, in a communication system, the data retransmission process may improve a success possibility of the data transmission. However, since the same information is transmitted many times, the resources may be relatively wasted.

In addition, the transmission node grossly transmits all lost packet data and the data related thereto. Meanwhile, the lost packet data may often have an error at some bits thereof.

Accordingly, the one-stop transmissions of the packet data have a problem in use of a radio resource.

The communication system needs an improved ARQ for requesting a minimum of additional resources so as to effectively use a bandwidth and for transmitting additional information so as to effectively use a resource.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a codeword retransmitting/decoding method and transmitting/receiving apparatus having advantages in requesting data retransmission and correcting an error using feedback information when data are erroneously transmitted.

An exemplary embodiment of the present invention provides a transmitting apparatus for transmitting a retransmission codeword using feedback information. The transmitting apparatus includes an index divider for indicating retransmission-request data locations as index information in predetermined division information based on a retransmission request information (the retransmission request information including retransmission-request code-bit location information) received from a receiving apparatus; a retransmission division determiner for calculating the number of packet data retransmission-used radio resources, comparing the calculated number of radio resources to the number of retransmission division information among the division information, and generating result information; and a transmission controller for forming a retransmission information bit by filling a retransmission-request code bit in the calculated radio resource using the index information, forming a retransmission codeword by adding a parity bit sequence to the formed information bit, and transmitting the retransmission codeword to the receiving apparatus.

Another embodiment of the present invention provides a retransmission method for a transmitting apparatus that receives a data retransmission request for retransmitting a codeword using feedback information. The retransmission method includes (a) receiving retransmission request information including retransmission-request code-bit location information from the receiving apparatus; (b) indicating index information in predetermined division information based on the received retransmission-request code-bit location information; (c) calculating the number of packet data retransmission-used radio resources and forming retransmission information bits by filing retransmission code-bits in the calculated number of radio resources using index information; and (d) forming a retransmission codeword by adding a parity bit sequence to the formed information bit and transmitting the retransmission codeword to the receiving apparatus.

Yet another embodiment of the present invention provides a decoding method of a receiving apparatus including (a) receiving a transmission codeword corresponding to packet data and determining whether the transmission codeword is an initial transmission codeword; (b) determining whether the channel decoding is successfully performed by performing channel decoding to the transmission codeword received at the step (a) when it is determined that the transmission codeword received at the step (a) has been an initial transmission codeword; (c) calculating an absolute value of reliability of code-bits included in an output value of a decoding means when the channel decoding is not successfully performed; and (d) searching reliability information having an absolute value smaller than a predetermined reference value, generating retransmission feedback information requesting data retransmission using the searched reliability information, and transmitting the retransmission feedback information to a transmitting apparatus.

Yet another embodiment of the present invention provides a receiving apparatus that decodes a retransmission codeword including a reliability searching unit for calculating an absolute value of reliability to code-bits included in an output value of an interworked decoding means, searching reliability information having a smaller absolute value than a predetermined reference value, and transmitting the reliability information to a transmitting apparatus; and a receiving controller for controlling interworking of with decoding means such that the received initial transmission codeword and the retransmission codeword are decoded, generating retransmission feedback information for retransmitting data using the searched reliability information, and transmitting the same to the transmitting apparatus when a decoding process of the just previously transmitted codeword has failed.

DETAILED DESCRIPTION OF THE EMBODIMENTS

Figure 1:
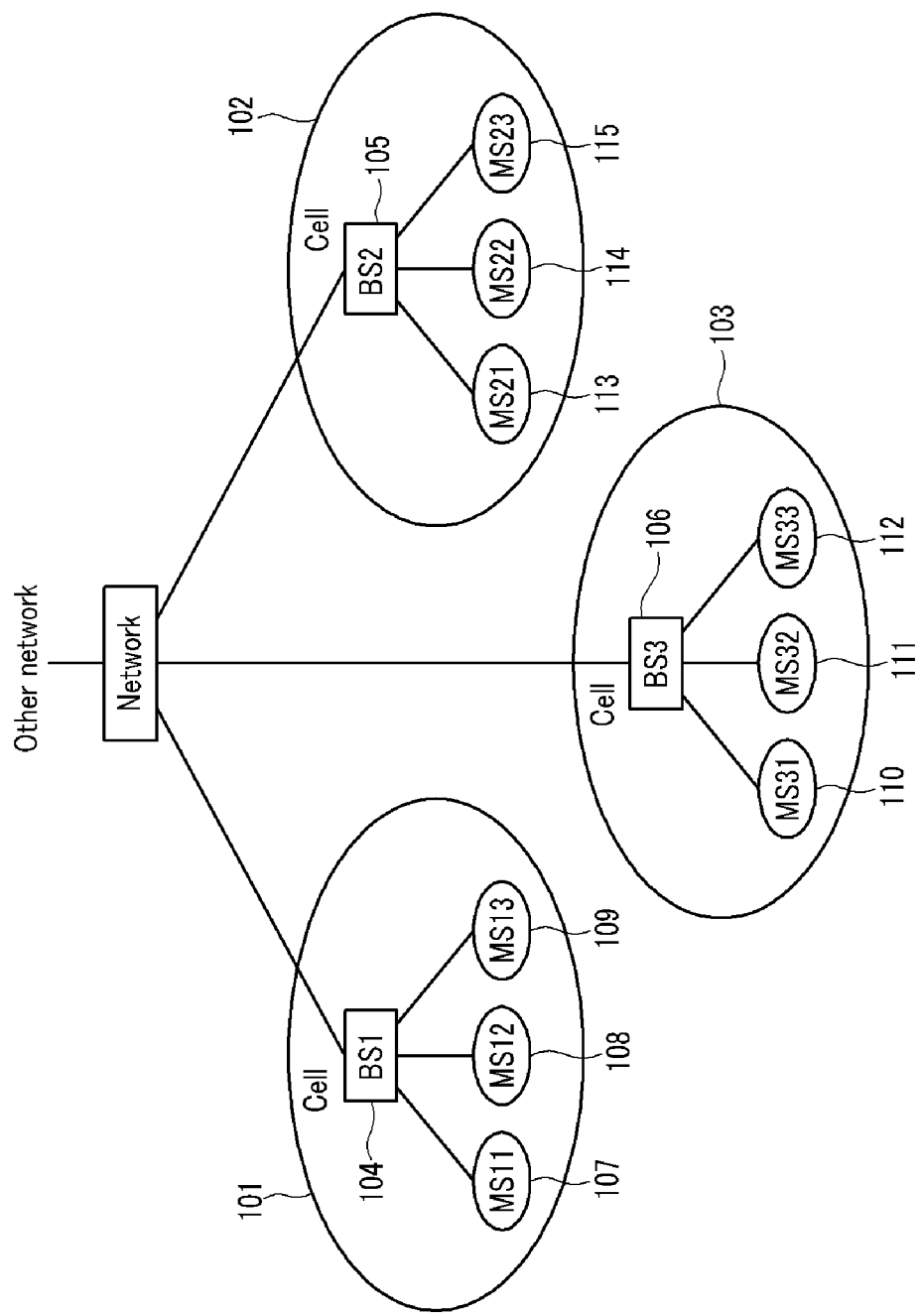
FIG. 1 is a block diagram schematically showing a wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

A codeword retransmitting/decoding method and transmitting/receiving apparatus using feedback information according to an exemplary embodiment of the present invention is now described with reference to FIG. 1 through FIG. 10.

FIG. 1 is a block diagram for schematically showing a wireless communication system.

A wireless communication system includes many cells having many wireless terminals and at least one base station.

The wireless communication system is set according to an exemplary embodiment of the present invention such that an automatic repeat request (ARQ) is performed. The wireless communication system may use any multiple access method. That is, the wireless communication system may apply all types of multiple access methods such as an orthogonal frequency division multiplexing (OFDM) or code division multiple access (CDMA).

As shown in FIG. 1, the wireless communication system includes a plurality of cells 101, 102, and 103.

The respective cells 101, 102, and 103 include a base station 104, 105, and 106, respectively. The respective cells 101, 102, and 103 are each expressed as an ellipse encompassing coverage areas of the base stations 104, 105, and 106, respectively.

The respective base stations 104, 105, and 106 are connected to a plurality of terminals 107, 108, and 109; 113, 114, and 115; and 110, 111, and 112, respectively.

The respective terminals 107, 108, 109, 110, 111, 112, 113, 114, and 115 may be mobile wireless terminals or fixed wireless terminals.

The respective base stations 104, 105, and 106 are connected through a network link as a network. The network is connected to other networks or an Internet.

Hereinafter, how a transmitting node allocates data to be transmitted and how recognition information ACK and NAK is used for informing a receiving state of the transmitted data between the base station and terminal are described in detail with reference to FIG. 2. The success recognition signal ACK is a message for informing of a packet data transmission success, and a failure recognition signal NAK is a message for informing of a packet data transmission failure.

Hereinafter, with reference to FIG. 2, the way in which each base station and terminal transmits/receives packet data through a predetermined channel will be explained.

Figure 2:
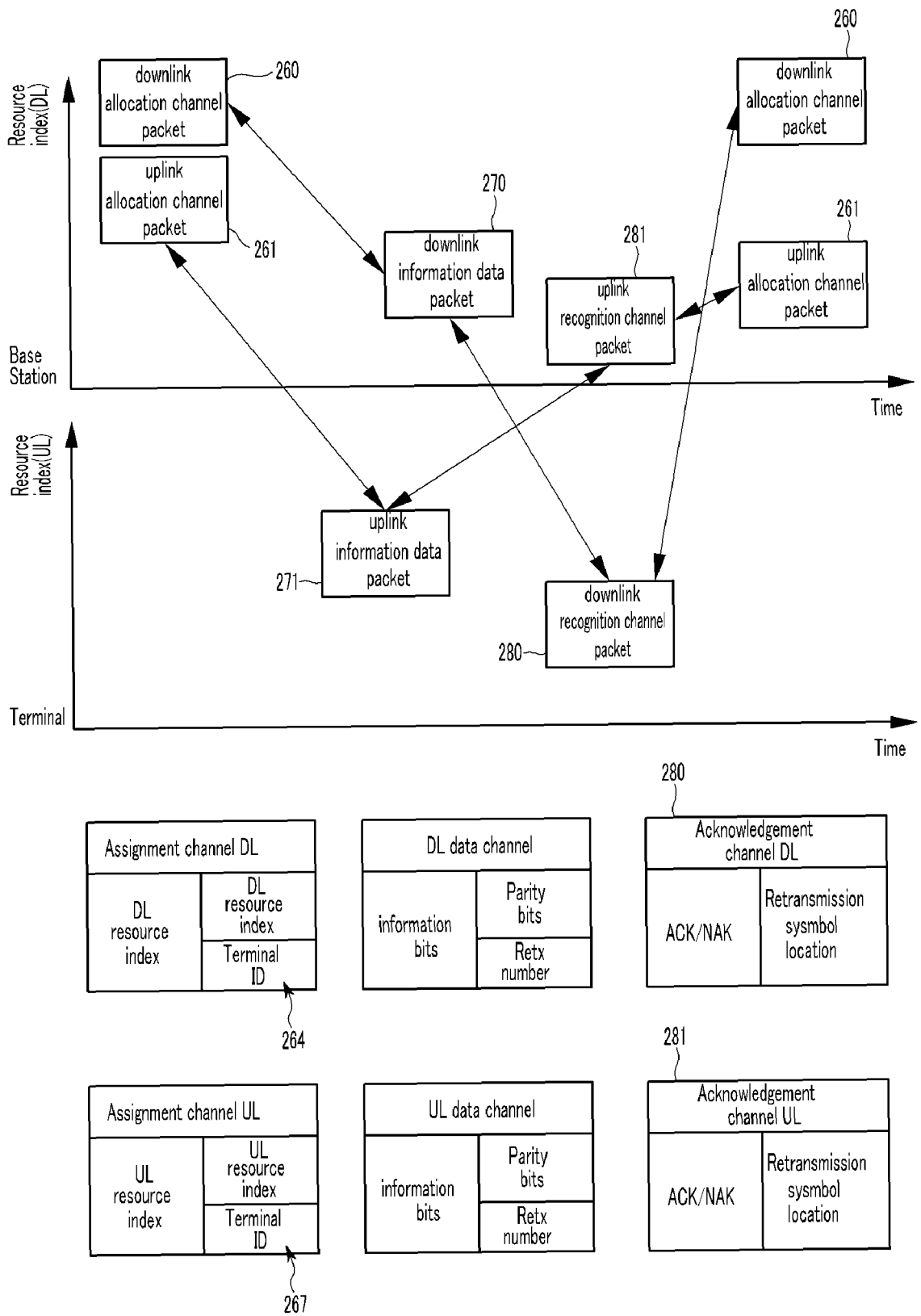
FIG. 2 illustrates how to transmit/receive between a base station and a terminal according to an exemplary embodiment of the present invention.

FIG. 2 illustrates how to transmit/receive between a base station and a terminal according to an exemplary embodiment of the present invention.

In FIG. 2, the horizontal axis indicates time, the vertical axis indicates an index of a predetermined resource through which data is transmitted, and each box indicates data.

According to an exemplary embodiment of the present invention, the packet data includes an allocation channel packet 260 for informing of an allocation location of downlink data, an allocation channel packet 261 for informing of an allocation location of uplink data, a downlink information data packet 270, an uplink information data packet 271, a downlink recognition channel packet 280 for informing of a receiving state of the downlink information data, and an uplink recognition channel packet 281 for informing of a receiving state of the uplink information data.

The recognition channel includes recognition information for indicating whether the data packet is successfully received.

The data packet may be transmitted through one or more radio resources and one or more time slots.

The up/downlink allocation channel packets 260 and 261 are transmitted though the downlink so as to inform of a data allocation location.

The up/downlink allocation channel packet 260 and 261 includes terminal indicators 264 and 267, which inform allocated terminal information regarding which terminal allocated to the downlink receives the corresponding information data.

The allocated terminal information may include channel decoding and modulation information for processing data included in the downlink information data packet 270 so as to simplify a receiving process.

The downlink information data packet 270 is related with the downlink allocation channel packet 260 in a predetermined manner. That is, the allocation channel packet and the information data packet may be related through indicator information for informing of an information data packet-transmission time and location.

A scheduler of the base station allocates resource location information to the uplink information data packet 271, in which the resource will be used by the respective terminals.

When the relation of the uplink/downlink allocation channel packet 260 and 261 and the uplink/downlink information data channel packet 270 and 271 has been previously set, the data allocation process may be simplified.

The uplink recognition channel packet 281 transmits recognition information through the related downlink information data packet 270.

The recognition information ACK/NAK includes at least 1 bit information, and is an indicator for informing of a receiving success/failure.

The downlink information data packet 270 is related to the uplink recognition channel packet 281 in a predetermined manner. In the same manner, the uplink information data packet 271 is previously related to the downlink recognition channel packet 280.

The downlink information data packet 270 or uplink information data packet 271 is used to transmit information data that the transmission node will transmit to the receiving node.

The information data may be expressed as a binary bit sequence and may be encoded though a channel code such as an LDPC code or a turbo code.

The channel decoding adds additional data to the packet so as to protect from generating a data error when the data is transmitted through a radio channel.

The uplink allocation channel packet 261 includes information about which channel is used for the terminal to transmit data to the base station.

The downlink information data packet 270 is a channel through which the base station transmits packet data to the terminal, and is related to the downlink allocation channel packet 260.

The uplink information data packet is a channel through which the terminal transmits packet data to the base station, it accepts an allocated resource location, and it is related to the uplink allocation channel packet 261. As described above, the resource will be used by the respective terminal and be allocated by the scheduler of the base station.

When the uplink/downlink allocation channel packet 260 and 261 are previously related to the uplink/downlink information data packet 270 and 271, the resource allocation operation may be simplified.

The uplink recognition channel packet 281 includes the uplink recognition information and the downlink recognition channel packet 280 includes downlink recognition information.

The uplink recognition information includes whether the downlink data are correctly transmitted to the terminal.

The downlink recognition information includes whether the uplink data are correctly transmitted to the base station.

The terminal receives the downlink data and then transmits the recognition information through the uplink recognition channel packet 281 to the base station.

The base station receives the uplink data and then transmits the recognition information through the downlink recognition channel packet 280 to the terminal. The recognition information includes a success recognition/failure recognition signal ACK or NAK for informing of a data receiving success/failure and includes at least 1 bit information.

Hereinafter, how to configure a retransmission codeword using information data to be retransmitted and parity information is described with reference to FIG. 3.

Figure 3:
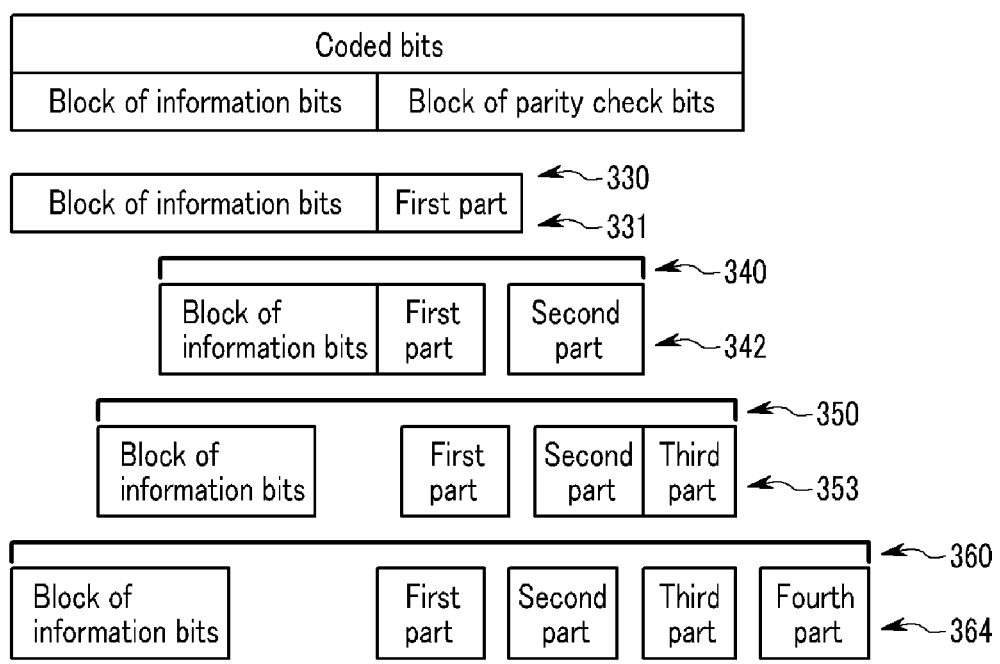
FIG. 3 illustrates how to configure a retransmission codeword according to an exemplary embodiment of the present invention, in which a transmitting apparatus allows an additional parity bit sequence to be included in an information bit.

FIG. 3 illustrates how to configure a retransmission codeword according to an exemplary embodiment of the present invention, in which a transmitting apparatus allows an additional parity bit sequence to be included in an information bit.

The decoding of channel codes such as an LDPC code and a turbo code adds a codeword including an additional parity bit sequence to the information bit so as to find and correct an error generated when data is transmitted through a radio channel.

As shown in FIG. 3, in order to be sequentially decoded, an extended codeword includes a new parity bit block for the respective bits of the original codeword.

An encoded codeword according to an exemplary embodiment of the present invention includes an addition bit block for checking parity with respect to the data information bit block.

The addition bit block includes a first bit block 331, a second bit block 342, a third bit block 353, and a fourth bit block 364.

The first codeword 330 includes the first information bit block 332 and the first addition bit block 331.

Accordingly, the first information bit block 332 and the first addition bit block 331 are combined into a data packet for a first transmission.

When the transmitting apparatus receives a failure recognition signal NAK from the receiving apparatus, the transmitting apparatus generates a new second codeword 340, third codeword 350, and fourth codeword 360 by adding the addition bit blocks to the previously transmitted codeword and retransmits the newly generated codeword to the respective receiving apparatuses.

The transmitting apparatus combines the first information bit block 332 and the first addition bit block 331 into the first codeword 330 and transmits the first codeword 330 to the receiving apparatus.

When the transmitting apparatus receives a failure recognition signal from the receiving apparatus (it receives the retransmission request signal) after the transmitting apparatus generates the first codeword 330 and transmits the same to the receiving apparatus, it adds the not-previously transmitted parity bit blocks (the second addition bit block 342, the third addition bit block 353, and the fourth addition bit block 364)

to the just previously transmitted codeword and sequentially transmits the new codeword to the receiving apparatus.

The additional parity bit blocks (the second addition bit block 342, the third addition bit block 353, and the fourth addition bit block 364) transmitted on the receiving of the failure recognition signal NAK forms increased additional information by extending the initial transmission codeword thereby increasing a decoding probability by way of the decoding means.

The additional parity bit block transmitted in this manner may successfully decode information as the length of the bit sequence becomes longer. (The first codeword 330<the second codeword 340<the third codeword 350<the fourth codeword 360)

The parity bit block is configured such that the parity check about the previous codeword is performed, and is additional information that is capable of decoding data in the receiving apparatus.

That is, the additional information for decoding the first codeword 330 is given as the second addition bit block 342, the additional information for decoding the second codeword 340 is given as the third addition bit block 353, and the additional information for decoding the third codeword 350 is given as the fourth addition bit block 364.

The retransmitted information bit may include a part or all of the information included in the initial transmission codeword.

When the receiving apparatus determines the decoding result about the first and second codeword 330 and 340 as the failure recognition signal NAK, the transmitting apparatus may again transmit information data on a third transmission.

The information included in the thirdly transmitted third codeword 350 may generate a new codeword by adding a new parity bit block (the third addition bit block 353) along with the information included in the secondarily transmitted second codeword 340.

Such processes are performed 3 times by repeating a codeword generation process according to an exemplary embodiment of the present invention as shown in FIG. 3. However, such processes may be repeatedly performed until a predetermined condition is satisfied.

Hereinafter, how to configure the retransmission codeword of FIG. 3 is described in detail with reference to FIG. 4.

Figure 4:
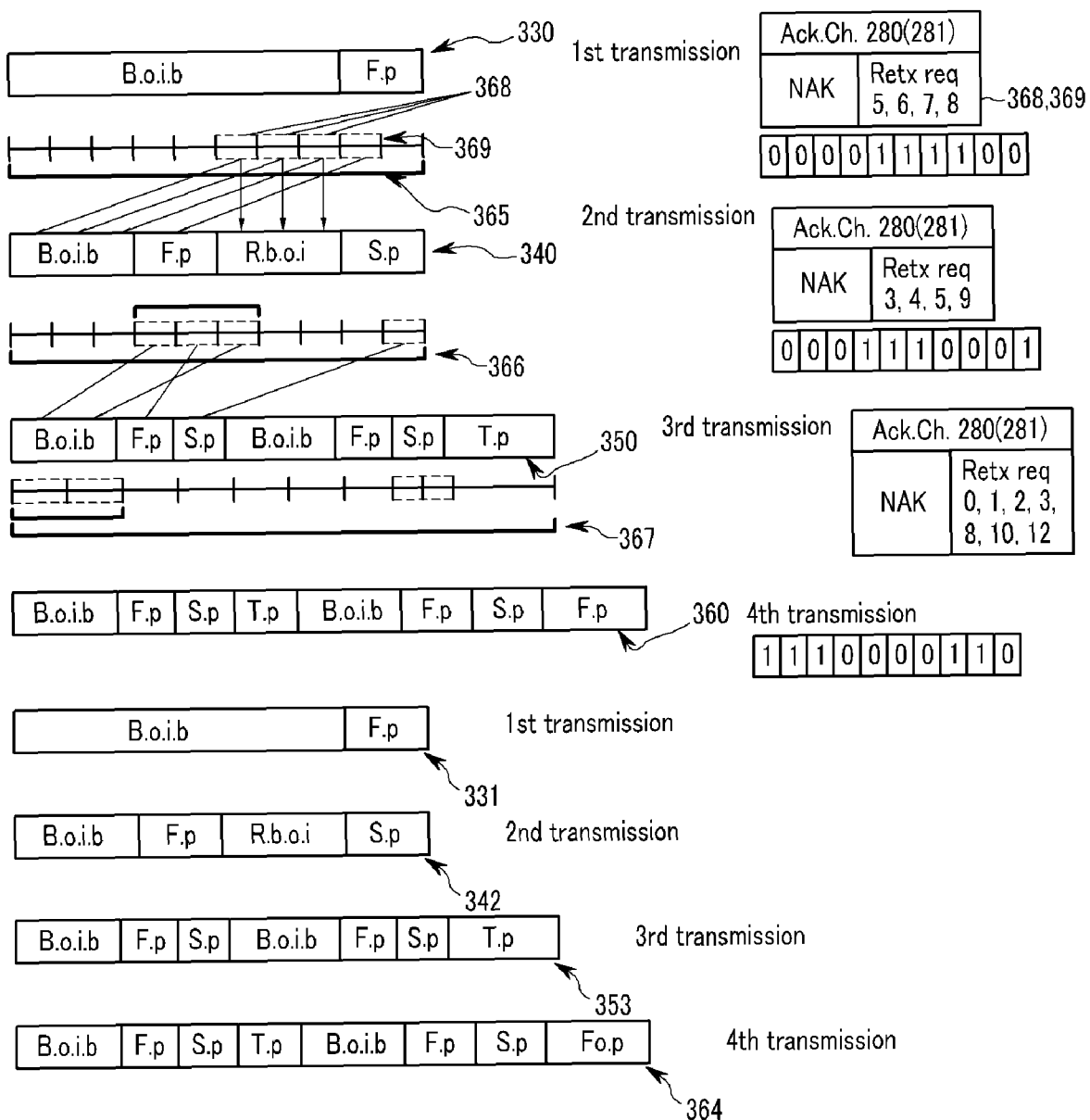
FIG. 4 illustrates how to configure retransmission feedback information and a retransmission codeword based on the same according to an exemplary embodiment of the present invention.

FIG. 4 illustrates how to configure retransmission feedback information and a retransmission codeword based on the same according to an exemplary embodiment of the present invention.

As shown in FIG. 4, each codeword 330, 340, 350, and 360 uses predetermined division information 365, 366, and 367 so as to easily express code-bit locations in the codeword.

Each codeword 330, 340, 350, and 360 expresses the corresponding bit locations into division index information using retransmission-request information (the retransmission request information defines information that will be requested to be retransmitted) among the retransmission feedback information 280 and 281 received from the receiving apparatus.

Methods for dividing division information includes a method for allocating consecutive same-length bit sequences of the codeword to each different division while increasing an index to each bit of the codeword (i.e., defining a code-bit as one division according to the regular sequence), and a method for configuring division information using a predetermined random pattern.

The transmitting apparatus sequentially performs an information retransmission from the division information including most of bits having smaller reliability than a predetermined reference value.

The reliability is an absolute value of an output value of the decoding means of the receiving apparatus. A probability that the present bit value is correct is increased as the absolute value is not near 0 and has been larger. In addition, it means that data decoding has failed when the absolute value is near 0.

How to configure the retransmission-request information includes preparing a bit sequence of a length corresponding to the number of divisions, setting a bit corresponding to an error location of the transmission-request division information as 1, and setting other bits as 0.

For example, as shown in FIG. 4, the retransmission request information among the retransmission feedback information 280 and 281 have set retransmission locations 368 and 369 of the first transmission codeword as 5, 6, 7, and 8.

Accordingly, the bit locations 368 and 369 of the 5, 6, 7, and 8 to be retransmitted are set as 1 and other locations is set as 0.

The retransmission feedback information 280 and 281 include success/failure recognition information for expressing the transmission success/failure of the packet data and retransmission request information of among the just previously transmitted codeword.

When the number of the division information is given as N, the information to be entirely retransmitted becomes N-bits.

When the transmitting apparatus receives the retransmission feedback information 280 and 281 through the recognition channel, the number of radio resources to be used for the retransmission may be less than the number of the division information.

In this case, the transmitting apparatus performs a codeword retransmission from the division information including low-reliability bits. Finally, an additional radio resource for expressing a retransmission order is required.

$M[\log 2]N$-numbered bits are required so as to express an order of the upper M-numbered divisions among the N-numbered divisions.

For example, when the number of divisions is given as 54, and the number of retransmission-request divisions is given as 3, a total of 18 bits are required.

As the codeword has a greater number of divisions, it may request a finite retransmission. However, since the number of bits included in the one division is reduced, many bits are requested to express information such as the upper order.

Accordingly, the codeword must be divided into the relatively smaller number.

The transmitting apparatus selects a codeword bit of the corresponding location according to a predetermined division rule.

It is one example that the information bit has been divided, and the division with respect to the previously transmitted entire codeword may include information bits and parity bits simultaneously.

At this time, the transmitting apparatus must store the just previously transmitted codeword.

When the transmitting apparatus calculates the number of radio resources to be used for the retransmission, and accordingly the retransmission-request code-bits are not all transmitted, the transmitting apparatus completes retransmission-codeword information bits by filing the retransmission-request division information in the division information bits sequentially in the most low-reliability codeword bit order.

Accordingly, a part of bits of the retransmission information bit division may be repeated at one or more times on the retransmission.

Hereinafter, the transmitting apparatus for configuring the retransmission codeword is described in detail with reference to FIG. 5.

Figure 5:
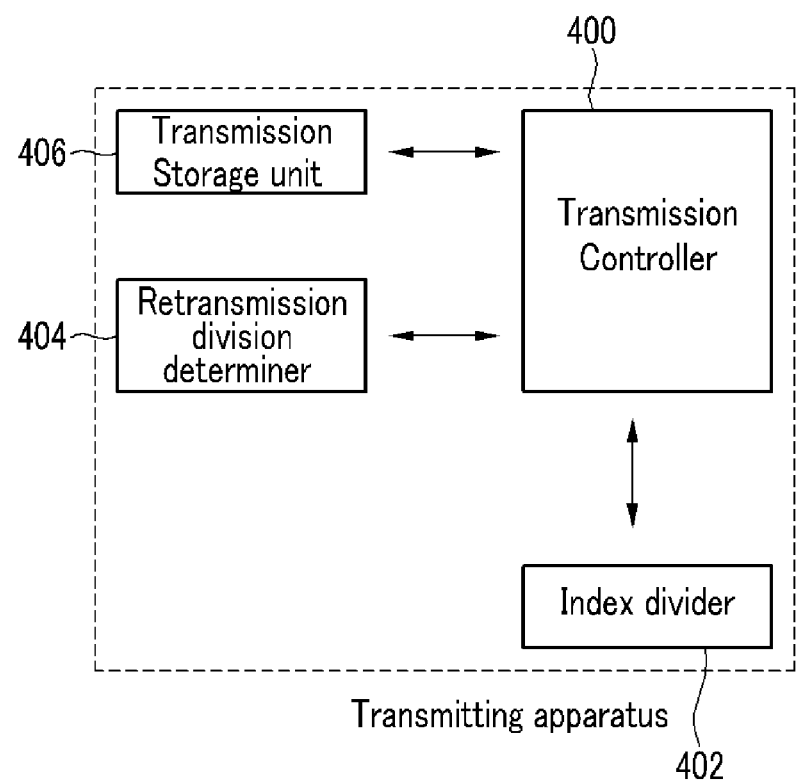
FIG. 5 is a block diagram for schematically showing a transmitting apparatus according to an exemplary embodiment of the present invention.

FIG. 5 is a block diagram for schematically showing a transmitting apparatus according to an exemplary embodiment of the present invention.

The transmitting apparatus according to an exemplary embodiment of the present invention encodes a codeword including the information bits and the additional parity bits and transmits the encoded codeword through the radio channel to the receiving apparatus.

In order to be sequentially decoded, the extended codeword includes new parity bits with respect to the respective code-bits of the original codeword.

Configuring additional parity bits may include using a predetermined pattern between the transmitting apparatus and the receiving apparatus or using a pattern defined as a parity check corresponding to a random number.

The transmitting apparatus includes a transmission controller 400, an index divider 402, a retransmission division determiner 404, and a transmission storage unit 406.

The transmission controller 400 receives the retransmission feedback information 280 and 281 through the recognition channel from the receiving apparatus, generates division information request signals for easily expressing the code-bit locations in each codeword, and transmits the generated division information request signals to the index divider 402. The code-bit means each bit information formed in the codeword.

The index divider 402 receives the division information request signals and then expresses retransmission-request code-bit locations into index information using the retransmission request information of the retransmission feedback information 280 and 281 among the predetermined division information.

The retransmission feedback information 280 and 281 includes the packet data-transmission failure information and the retransmission request information.

The retransmission request information means location information of the code-bits to be retransmitted among the just-previously transmitted codeword.

The transmission controller 400 completes the retransmission information bit by sequentially filing retransmission-request code-bits in the retransmission-used radio resource using the index information for expressing retransmission-request code-bit locations.

The transmission controller 400 may configure a codeword by repeating a part of bits of the retransmission division information one or more times when some retransmission-used radio resources are left.

The transmission controller 400 configures a retransmission codeword by adding a parity bit sequence to the completed information bit and transmits the retransmission codeword to the receiving apparatus.

The retransmission division determiner 404 receives the retransmission feedback information 280 and 281 through the recognition channel from the receiving apparatus and then calculates the number of packet data retransmission-used radio resources.

The retransmission division determiner 404 generates result information obtained by comparing the calculated number of radio resources to the number of the retransmission division information and transmits the result information to the transmission controller 400. The retransmission division information means the selected division information including the predetermined number or more of the code-bits having smaller reliability than the predetermined reference value in the predetermined division information.

When the transmission controller 400 receives the result information that the calculated number of radio resources is smaller than the number of the retransmission information, the transmitting apparatus completes retransmission-codeword information bits by filing the retransmission-request division information in the division information bits sequentially in the most low-reliability codeword bit order.

The transmission controller 400 has a radio resource for storing retransmission order information so as to indicate a retransmission division information order.

The transmission controller 400 may configure a retransmission codeword according to the retransmission division information order.

When some retransmission-used radio resources are left, the transmission controller 400 may complete retransmission-codeword information bits by filing the retransmission-request division information in the radio resources sequentially in the most-retransmission requested retransmission division information order. Accordingly, some bits of the retransmission division information may be repeated one or more times on the retransmission.

The transmission storage unit 406 stores the just previously used codeword, the division information requested by the retransmission request information, the retransmission feedback information 280 and 281, the index information, and the retransmission-request codeword.

Hereinafter, the receiving apparatus receiving the retransmission codeword is described with reference to FIG. 6.

Figure 6:
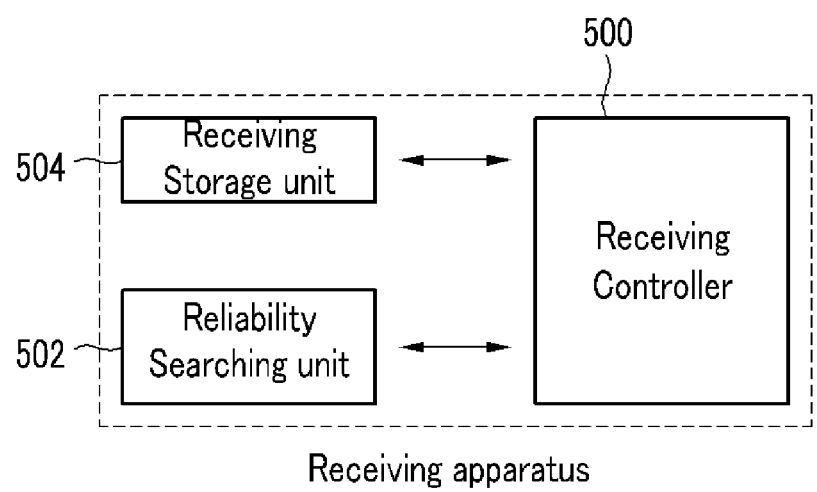
FIG. 6 is a block diagram for schematically showing a receiving apparatus according to an exemplary embodiment of the present invention.

FIG. 6 is a block diagram for schematically showing a receiving apparatus according to an exemplary embodiment of the present invention.

The receiving apparatus reconstructs distorted bits by means of the channel, and extracts the transmitted information bits from the reconstructed bits.

The receiving apparatus may reconstruct the reconstructed information bits as final information data through channel decoding.

According to an exemplary embodiment of the present invention, the receiving apparatus includes a receiving controller 500, a reliability searching unit 502, and a receiving storage unit 504.

The receiving controller 500 receives a transmission codeword corresponding to the packet data from the transmitting apparatus, and then determines whether the channel decoding to the transmission codeword is successfully performed by interworking with the decoding means.

The receiving controller 500 receives a retransmission request signal for indicating a channel decoding failure to the transmission codeword from the decoding means and transmits the same to the reliability searching unit 502.

The reliability searching unit 502 receives the retransmission request signal from the receiving controller 500 and then receives the output values from the decoding means by interworking with the decoding means.

The output value of the decoding means is defined as a Log Likelihood Ratio (LLR; reliability) for indicating whether the information data and parity bits have correct values.

The LLR is an absolute value of an output value of the decoding means. It means that a probability that the present bit value is correct is high as the absolute value is not near 0 and has been larger. In addition, it means that data decoding has failed when the absolute value is near 0.

The reliability searching unit 502 calculates the absolute value of reliabilities of each code-bit included in the output value of the decoding means, detects reliability information having smaller absolute values than the predetermined reference value, and transmits the reliability information to the receiving storage unit 504.

The receiving storage unit 504 stores the reliability information having the smaller absolute values than the predetermined reference value at the respective storing spaces according to a reliability-magnitude.

When the receiving controller 500 receives a retransmission codeword from the transmitting apparatus, it configures a new matrix combined with an initial transmission codeword-parity check matrix and a retransmission codeword-parity check matrix.

When the receiving controller 500 receives the retransmission codeword from the transmitting apparatus, it calculates a new LLR by adding a retransmission codeword-LLR and an LLR of the code-bits corresponding to the initial transmission codeword among the retransmission codeword.

The receiving controller 500 generates the retransmission feedback information 280 and 281 using the reliability information obtained by the reliability searching unit 502, and transmits the generated retransmission feedback information 280 and 281 through the recognition channel to the transmitting apparatus.

The retransmission feedback information 280 and 281 includes success/failure recognition information for indicating the packet data-transmission failure and the retransmission-request information among the just-previously transmitted codeword.

The success recognition signal ACK is a message for informing a packet data-transmission success and the failure recognition signal NAK is a message for informing a packet data-transmission failure.

Hereinafter, a retransmission codeword structure and a parity check matrix structure used to demodulate the same are described in detail with reference to FIG. 7.

Figure 7:
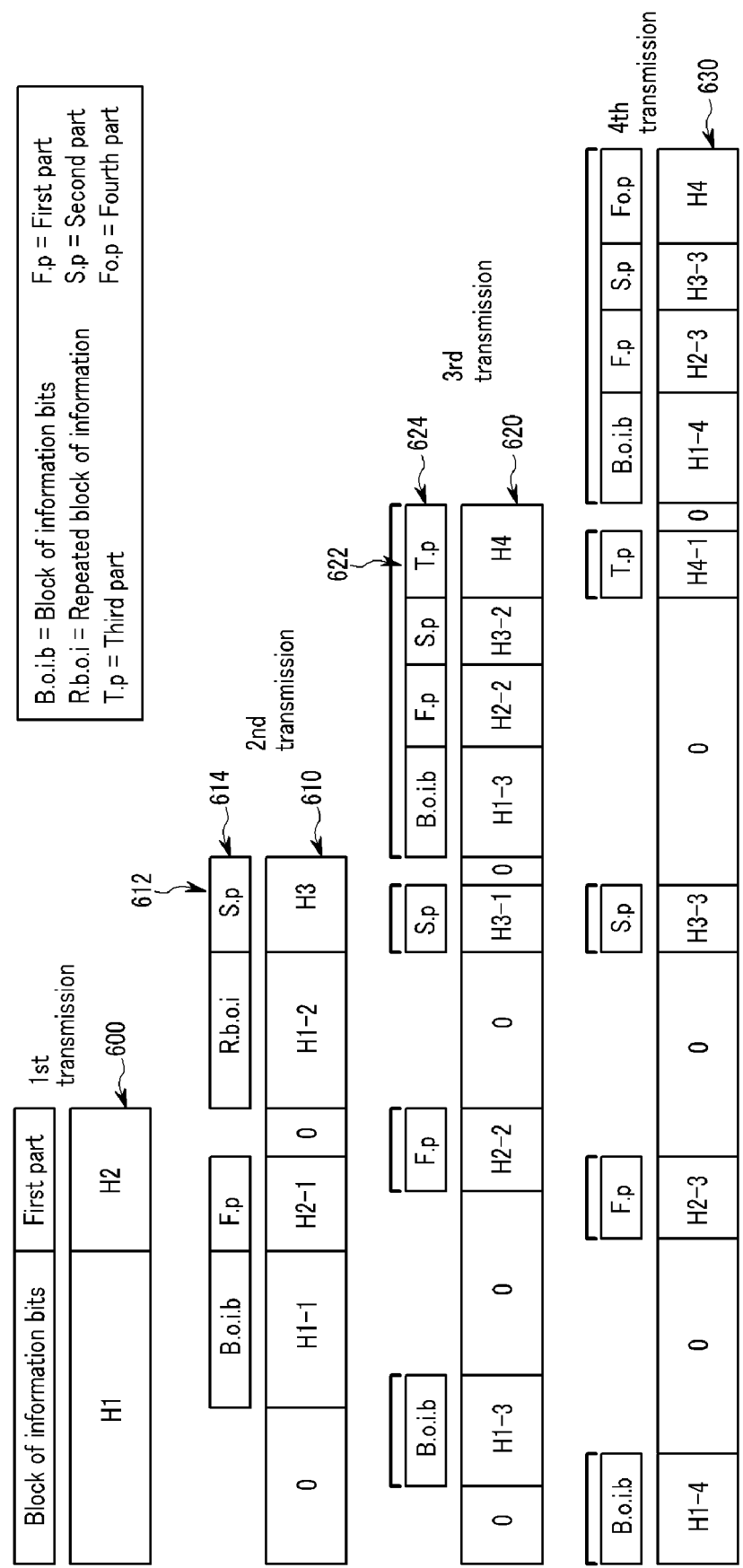
FIG. 7 illustrates a parity test matrix of an LDPC code used in an encoding process of a retransmission codeword according to an exemplary embodiment of the present invention.

FIG. 7 illustrates a parity test matrix of an LDPC code used in an encoding process of a retransmission codeword according to an exemplary embodiment of the present invention.

Each parity check matrix 600, 610, and 620 encodes a codeword to be generated for each retransmission.

At the transmitting apparatus, each parity check matrix 600, 610, and 620 generates parity bit sequences using the information bit and encodes a retransmission codeword, and at the receiving apparatus, each parity check matrix 600, 610, and 620 demodulates the information bit using the parity bit sequences.

The transmitting apparatus configures a new information bit part by repeating parts of the information bits and parity bits by the number of the retransmission-used radio resources when the retransmission request information transmitted from the receiving apparatus includes the parts of the information bit of the codeword and the parity bits, forms a second parity bit sequence 612 using the first parity check matrix 610, and encodes a first retransmission codeword 614 to the receiving apparatus.

The transmitting apparatus configures information bit parts of a retransmission codeword by repeating parts of the information bit and parity bit by the number of the retransmission-used radio resources when the retransmission request information transmitted from the receiving apparatus is the parts of the information bit and the parity bits, forms a third parity bit sequence 622 using a second parity check matrix 620, and encodes a second retransmission codeword 624 to the receiving apparatus.

Such parity check matrixes 600, 610, 620, and 630 may be used as is to decode the retransmission codeword in the receiving apparatus.

The receiving apparatus may perform a retransmission codeword combination process before performing a decoding process to the retransmission codeword.

The receiving apparatus having received the retransmission codeword must appropriately combine the initial transmission and retransmission codewords.

In addition, the receiving apparatus having received the retransmission codeword must add each of the LLRs to each other, because an initial transmission codeword code-bit LLR is different from a retransmission codeword code-bit LLR.

When the retransmission codeword has a code-bit corresponding to the initial transmission codeword, the receiving apparatus may calculate a new LLR by adding an LLR thereof to the corresponding code-bit and perform a decoding process.

Since the LLR having added codeword code-bits generally improves an LLR, a decoding performance has been improved.

In order to decode non-retransmission codeword code-bits of the initial transmission among the retransmission codeword, the receiving apparatus must combine the retransmission codeword/initial transmission codeword parity check matrixes 600, 610, 620, and 630.

The receiving apparatus must combine each parity check matrix 600, 610, 620, and 630 when the retransmission codeword includes the repeated information of the initial transmission codeword.

Such a combination process may be achieved by connecting additional parity check matrixes 600, 610, 620, and 630 rather than by directly adding a codeword-bit.

A channel code for decoding a retransmission codeword is described in detail with reference to FIG. 8.

Figure 8:
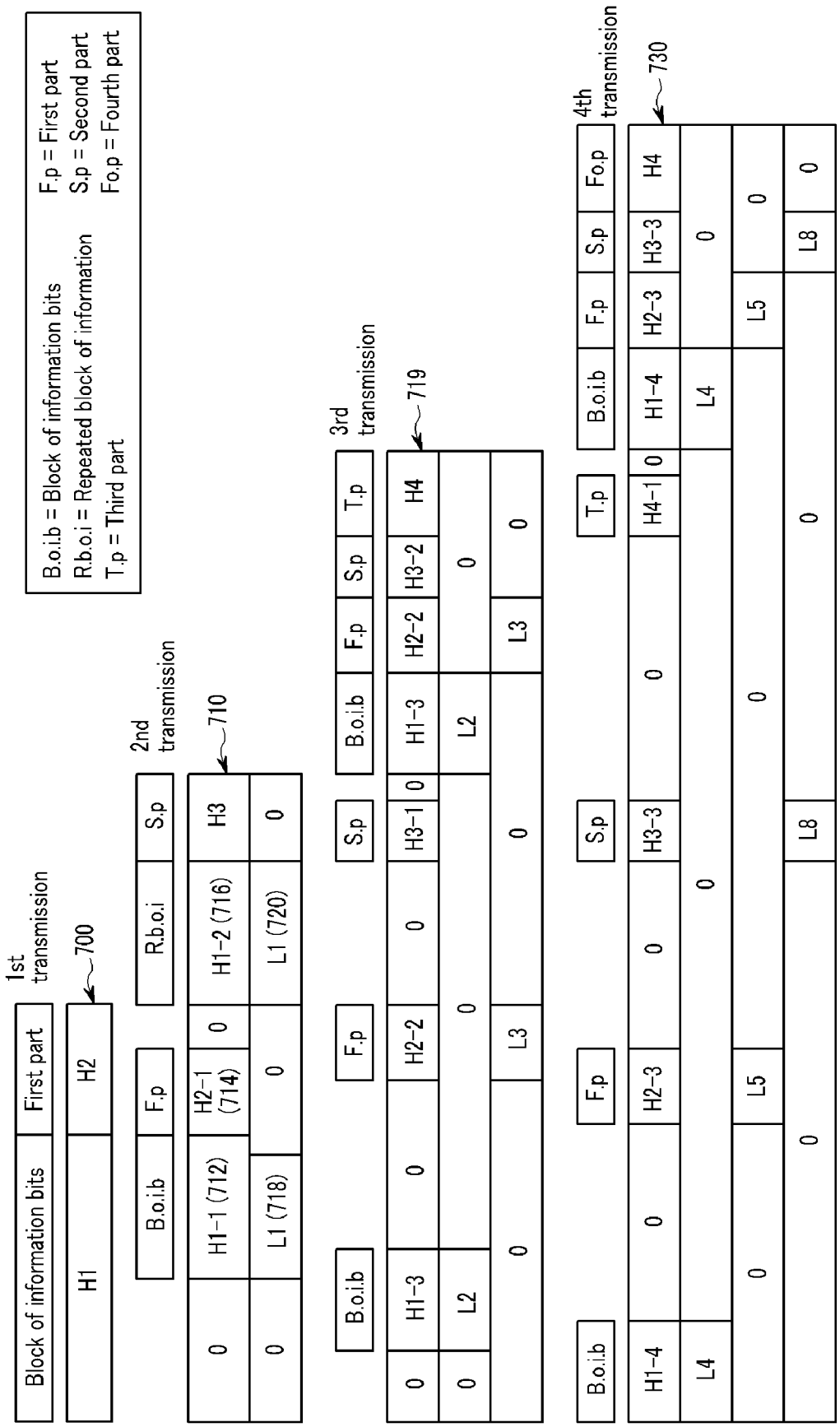
FIG. 8 illustrates a parity test matrix used in a decoding process of a retransmission codeword according to an exemplary embodiment of the present invention.

FIG. 8 illustrates a parity test matrix used in a decoding process of a retransmission codeword according to an exemplary embodiment of the present invention.

According to an exemplary embodiment of the present invention, decoding-parity check matrixes 710, 720, and 730 are different from encoding-parity check matrixes of the LDPC codes used in FIG. 7.

The first parity check matrix 710 is configured by including the same while dividing a part of the parity check matrix 700 used on the initial transmission so as to decode a retransmission codeword received in response to the retransmission request signal.

In other words, each part matrix 712, 714, and 716 of the first parity check matrix 710 is configured by obtaining information for searching retransmission codeword-error bits from the initial transmission parity check matrix 700.

The second and third parity check matrixes 720 and 730 include a part of the just previously transmitted parity check matrix in the same manner as the first parity check matrix 710.

Part matrixes (H1-1 and H1-2) 712 and 716 share a same-type matrix because the same information bit is repeatedly transmitted.

Since the part matrix (L1) 718 and 719 of the first parity check matrix 710 respectively corresponds to an identity matrix, these two identity matrixes have the same numbered rows and columns.

Since the parity check matrixes 710, 720, and 730 have identity matrix arrangements, the repeatedly transmitted two part-LLRs may be added by way of the decoding process without previously adding an LLR during the codeword-decoding process.

Accordingly, each parity check matrix 710, 720, and 730 includes additional identity matrixes so as to combine the repeated information.

The codeword sequentially decodes an initially received codeword and a first transmission codeword through the above-noted parity check matrix.

The receiving apparatus extracts the corresponding codeword-information bit when the decoding is successfully finished.

The extracted information bit is always determined as an effective value because the decoding is successfully finished.

Accordingly, the extracted information bit sets the absolute value of the LLR of the retransmission information bit as infinite such that the reliability is not affected by an erroneous information bit.

When the receiving apparatus sets a reliability of the extracted information bit as infinite, the reliability of the code-bit included in the retransmission codeword among the initial transmission codeword may be re-set as infinite.

As a result, the decoding may be performed again for consecutive information data by improving the reliability of each code-bit of the initial transmission codeword.

When the receiving apparatus does not determine error information included in the retransmission codeword by the decoding means, the reliability of the extracted information bit may be erroneously estimated.

Accordingly, the receiving apparatus may set the extracted information bit-reliability as an appropriately large value rather than setting the reliability as infinite.

In addition, when the receiving apparatus fails to decode a retransmission code-bit, it may decode the initial transmission codeword code-bit rather than decoding the retransmission codeword.

When the reliabilities are added by extracting code-bits included on only the initial transmission codeword, it requires only the initial transmission codeword and the parity check matrix thereof.

However, if all of the initial transmission codeword and the retransmission codeword are used for decoding, the receiving apparatus performs decoding by a new matrix that combines the initial transmission codeword-parity check matrix and the retransmission codeword-parity check matrix.

The receiving apparatus may not use the retransmission codeword-LLR but adds extrinsic information to the initial transmission codeword when it combines code-bits included simultaneously in the initial transmission and retransmission codewords, thereby improving decoding performance. The extrinsic information is defined as a difference between the output retransmission codeword-LLR of the decoding means and the input retransmission codeword-LLR.

Such a process may perform a codeword decoding process in the same manner as the retransmission codeword process using each parity check matrix on third and fourth retransmissions.

When the receiving apparatus performs a decoding process using a turbo code, it independently decodes each retransmission codeword without reconstructing an additional parity check matrix and then respectively adds each bit-reliability, thereby improving decoding performance.

Hereinafter, how to transmit a codeword in the transmitting apparatus configured the codeword using the retransmission feedback information 280 and 281 is described in detail with reference to FIG. 9.

Figure 9:
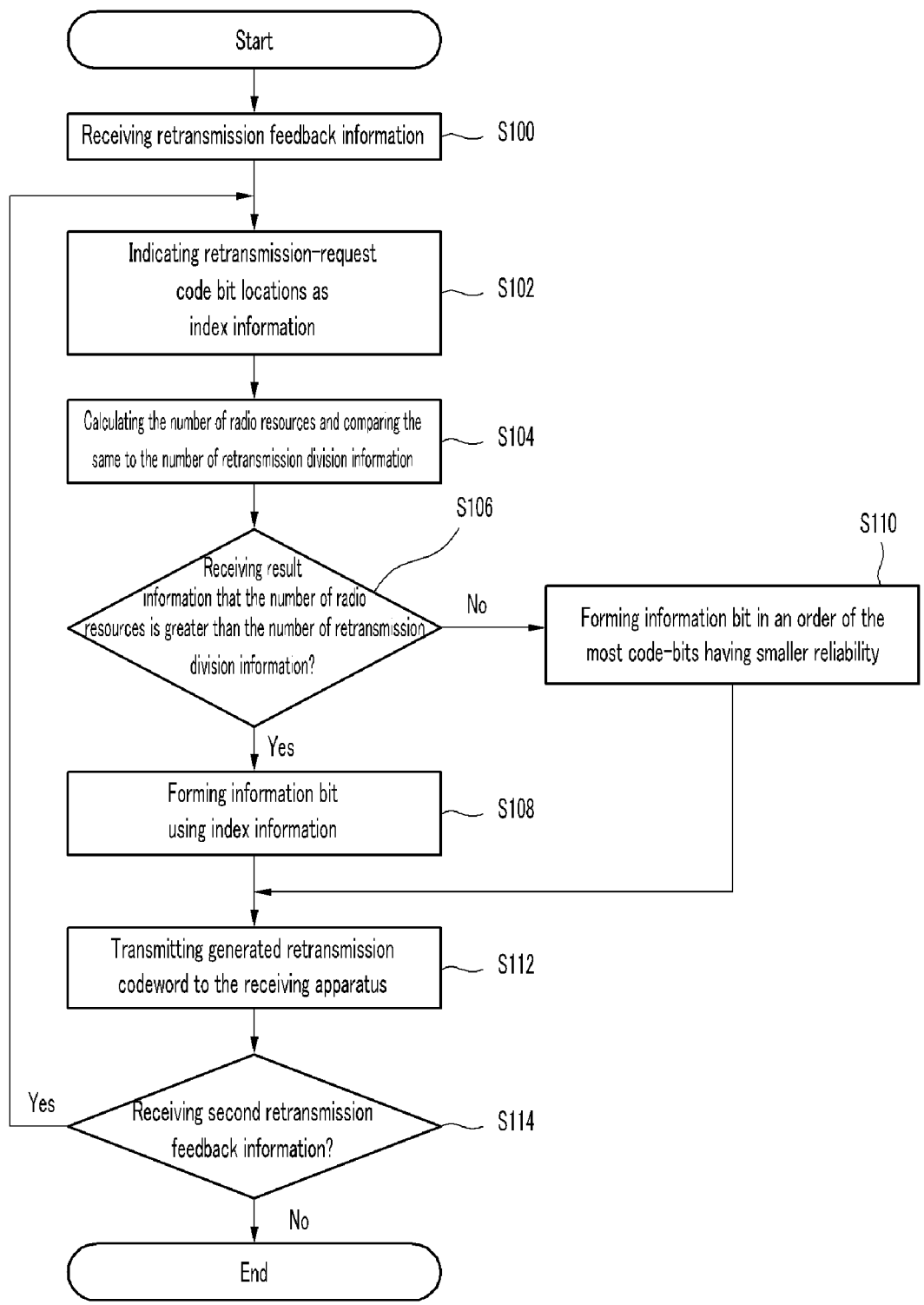
FIG. 9 illustrates how to retransmit a codeword according to an exemplary embodiment of the present invention, in which a transmitting apparatus uses retransmission feedback information 280 and 281.

FIG. 9 illustrates how to retransmit codewords according to an exemplary embodiment of the present invention, in which a transmitting apparatus uses retransmission feedback information 280 and 281.

The transmitting apparatus encodes the transmission codeword including the information bit and parity bit and transmits the encoded transmission codeword through the radio channel to the receiving apparatus.

The receiving apparatus subsequently performs decoding to the received transmission codeword by way of the decoding means.

When the transmission codeword has an error at a part thereof and accordingly the decoding process has failed, the receiving apparatus generates the retransmission feedback information 280 and 281 so as to again accept erroneous parts of the transmission codeword and transmits the same to the transmitting apparatus.

The retransmission feedback information 280 and 281 include the packet data-transmission failure information and the retransmission-request information among the just previously transmitted codeword.

The transmission controller 400 receives the retransmission feedback information 280 and 281 from the receiving apparatus (S100), generates a division information request signal so as to easily express code-bit locations in the transmission codeword, and transmits the same to the index divider 402.

The index divider 402 indicates the code-bit locations to be retransmitted as index information using the transmission request information of the retransmission feedback information 280 and 281 among the predetermined division information (S102).

The retransmission feedback information 280 and 281 includes the packet data-transmission failure information and the retransmission request information.

The retransmission request information means the location information of the code-bits to be retransmitted among the just previously transmitted codeword.

The index divider 402 sets the code-bits corresponding to division location information to be retransmitted among the predetermined division information as 1 and other code-bits as 0 so that it indicates the erroneous data as an index.

When the retransmission division determining unit 404 receives the retransmission feedback information 280 and 281 from the receiving apparatus, it calculates the number of retransmission-used radio resources and compares the number of the calculated radio resources to the number of the retransmission division information (S104).

The retransmission division information means the selected division information including a predetermined number or more of code-bits having smaller reliability than the predetermined reference value in the predetermined division information.

The retransmission division determining unit 404 generates result information obtained by comparing the number of the calculated radio resources to the number of the retransmission division information and transmits the result information to the transmission controller 400 (S106).

When the transmission controller 400 receives the result information that the number of the calculated radio resources is greater than the number of the retransmission division information, it forms an information bit by sequentially filing the retransmission division information in the retransmission-used radio resources using index information thereof (S108).

The transmission controller 400 may configure an information bit by repeating a part of the retransmission division information bits when some radio resources are left.

When the transmission controller 400 receives the result information that the number of the calculated radio resources is smaller than the number of the retransmission division information, it sequentially completes an information bit according to a retransmission division information order including most code-bits having smaller reliability than the predetermined reference value (S110).

The transmission controller 400 forms a retransmission codeword by adding the parity bit sequence to the completed information bit and transmits the same to the receiving apparatus (S112).

The transmission controller 400 transmits the formed retransmission codeword to the receiving apparatus, and determines whether the second transmission feedback information 280 and 281 related to the retransmission codeword is received from the receiving apparatus (S114).

When the transmission controller 400 determines that the second retransmission feedback information 280 and 281 have been received, the steps S102 to S112 are repeated, thereby performing a retransmission codeword generation process.

How to decode a codeword in the receiving apparatus is described with reference to FIG. 10.

Figure 10:
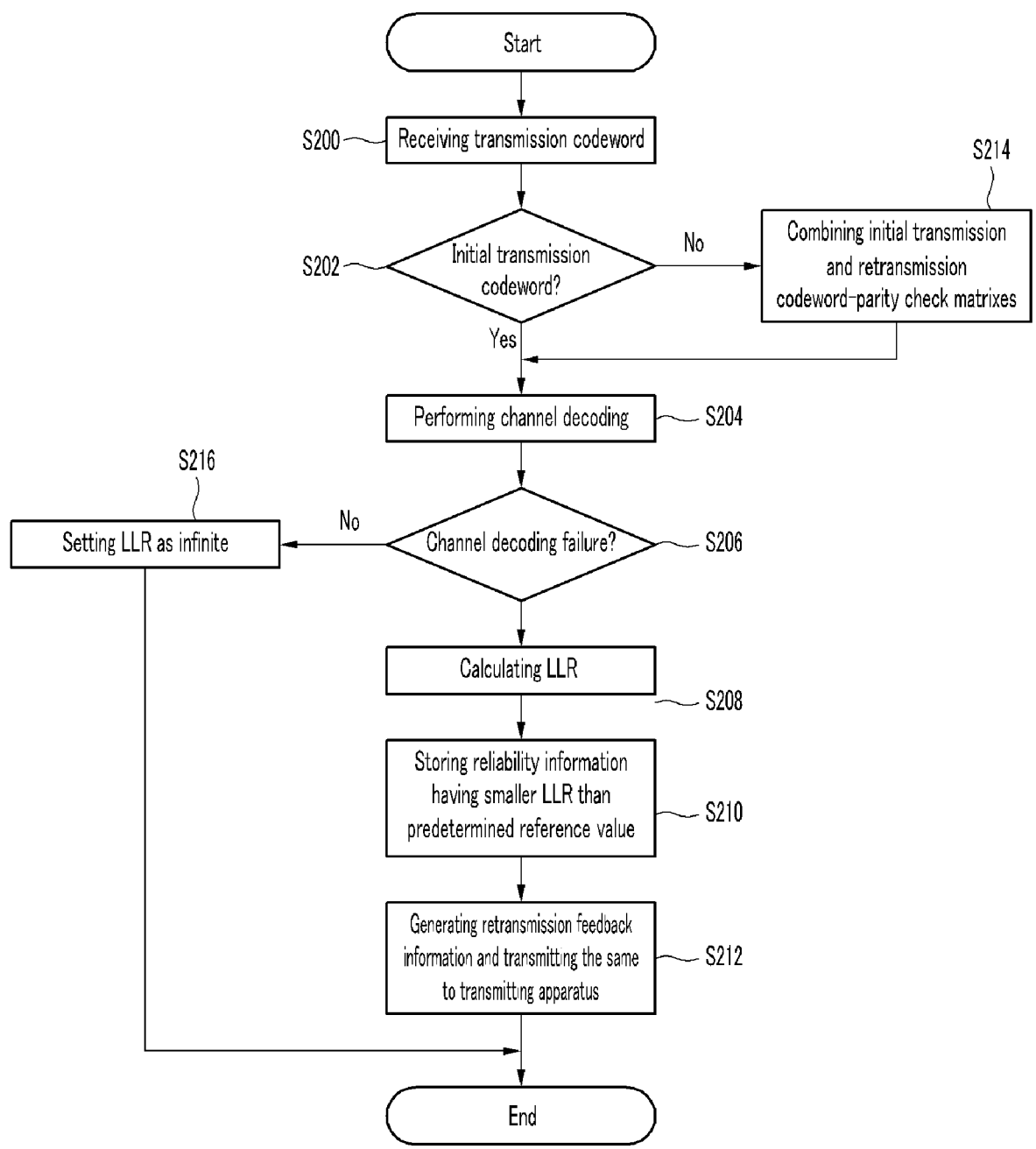
FIG. 10 illustrates how a receiving apparatus receives and decodes a retransmission feedback information-used codeword according to an exemplary embodiment of the present invention.

FIG. 10 illustrates how a receiving apparatus receives and decodes a retransmission feedback information-used codeword according to an exemplary embodiment of the present invention.

The receiving controller 500 receives a transmission codeword corresponding to the packet data, and determines whether the received transmission codeword is the initial transmission codeword (S200, S202).

At the step S202, when the received transmission codeword is determined as the initial transmission codeword, the receiving controller 500 of the receiving apparatus performs channel decoding to the transmission codeword by interworking with the decoding means (S204).

The receiving controller 500 determines whether the channel decoding to the transmission codeword is successfully performed (S206).

At the step S206, the receiving controller 500 receives the retransmission request signal indicating that the channel decoding to the transmission codeword has failed, it obtains the absolute value of the output value of the decoding means, and calculates an LLR (S208).

The LLR means that a probability that the present bit value is correct is high as the absolute value is not near 0 and has been larger. In addition, it means that data decoding has failed when the absolute value is near 0.

The reliability searching unit 502 calculates the absolute value of each code-bit reliability included in the decoding means's output values, searches reliability information having smaller absolute values than the predetermined reference value, and stores reliability information at the receiving storage unit 504 according to the reliability-magnitude (S210).

The receiving controller generates the retransmission feedback information 280 and 281 using the reliability information searched from the reliability searching unit 502, and transmits the generated retransmission feedback information 280 and 281 through the recognition channel to the transmitting apparatus (S212).

The retransmission feedback information 280 and 281 includes the packet data-transmission failure information and the retransmission request information. The retransmission request information means the location information of the code-bits to be retransmitted among the just previously transmitted codeword.

At the step S202, when the received transmission codeword is determined as the initial transmission codeword, the receiving controller 500 of the receiving apparatus combines the initial transmission codeword-parity check matrix and the retransmission codeword-parity check matrix and then performs the channel decoding to these codewords (S214).

Such a parity check matrix combination is achieved by dividing a part of the parity check matrix used in the initial transmission and including the divided part in the retransmission codeword-parity check matrix.

In other words, each part matrix of the retransmission codeword-parity check matrix is configured by obtaining the information (capable of searching error bits) corresponding to the retransmission codeword in the initial transmission codeword-parity check matrix.

Since the part matrixes of the parity check matrix are identity matrixes, two repeatedly transmitted part-LLRs are added during the decoding.

At the step S206, when it is determined that the channel decoding to the transmission codeword has been successfully performed, the receiving controller 500 always determines the values as an effective value because the channel decoding is successfully completed by the decoding means.

Accordingly, the receiving controller 500 sets the absolute value of the retransmission information bit-LLR as infinite such that the extracted information bit is not affected on the reliability due to the erroneous information bit (S216).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, the retransmission success probability may be increased when the receiving apparatus configures the retransmission feedback information by repeating the codeword just previously transmitted so as to decode the retransmission part.

In addition, since the receiving apparatus provides the additional information capable of grasping the detailed erroneous parts of the transmitted packet data to the transmitting apparatus, the additional quality may be improved and the secondary decoding gain may be obtained.

In addition, since the reliability information of the initial transmission data and the retransmission data are improved, the decoding performance of the retransmission-request corresponding data part may be improved.

The user communication environment of the peripheral of the cell may be improved when the data reliability of the parts having low reliability in the initial transmission is improved and the additional decoding gain is obtained.

What is claimed is:

1. A transmitting apparatus for codeword retransmission using feedback information, the transmitting apparatus comprising:
    an index divider for indicating index information in predetermined division information based on retransmission request information received from a receiving apparatus, wherein the retransmission request information includes location information on retransmission code-bits to be retransmitted;
    a retransmission division determiner for calculating a number of radio resources for packet data retransmission, comparing the calculated number of radio resources to retransmission division information, and generating result information, wherein the retransmission division information includes a number of the retransmission code-bits which have lower reliability than a predetermined reference value in the predetermined division information; and a transmission controller for, based on the result information, forming retransmission information bits by filling the retransmission code-bits in the calculated number of radio resources using the index information, forming a retransmission codeword by adding a parity bit sequence to the formed retransmission information bits, and transmitting the retransmission codeword to the receiving apparatus.

2. The transmitting apparatus of claim 1, wherein the retransmission request information indicates location information of the retransmission code-bits of a previously transmitted codeword.

3. The transmitting apparatus of claim 1, wherein the transmission controller configures the retransmission information bits by repeating one or more of the retransmission code-bits one or more times when some of the calculated number of radio resources are left.

4. A retransmission method for codeword retransmission using feedback information, said method being performed in a transmitting apparatus and comprising:

receiving retransmission request information from a receiving apparatus, wherein the retransmission request information includes location information on retransmission code-bits to be retransmitted;

indicating index information in predetermined division information based on the received location information;

calculating a number of radio resources for packet data retransmission;

when the calculated number of the radio resources is greater than retransmission division information, forming retransmission information bits by filing the retransmission code-bits in the calculated number of radio resources using the index information, wherein the retransmission division information includes a number of the retransmission code-bits which have lower reliability than a predetermined reference value in the predetermined division information; and forming a retransmission codeword by adding a parity bit sequence to the formed retransmission information bits, and transmitting the retransmission codeword to the receiving apparatus.

5. The retransmission method of claim 4, further comprising:

when the calculated number of the radio resources is not greater than the number of the retransmission division information, filing the retransmission code-bits sequentially in accordance with a most low-reliability codeword bit order.

6. A decoding method performed by a receiving apparatus, said method comprising:

receiving, from a transmitting apparatus, a transmission codeword corresponding to packet data and determining whether the transmission codeword is an initial transmission codeword;

determining whether a channel decoding is successfully performed by performing channel decoding on the received transmission codeword when it is determined that the received transmission codeword is an initial transmission codeword;

calculating an absolute value of reliability of each of code-bits included in an output value of said channel decoding when the channel decoding is not successfully performed; and identifying one or more code-bits in the output value with the respective absolute value(s) smaller than a predetermined reference value, generating retransmission feedback information requesting data retransmission of the identified code-bits, and transmitting the retransmission feedback information to the transmitting apparatus.

7. The decoding method of claim 6, further comprising:

when the calculated transmission codeword is determined to be a retransmission codeword rather than the initial transmission codeword, separating a part of a parity check matrix used in the initial transmission codeword and including the separated part in a parity check matrix of the retransmission codeword.

8. The decoding method of claim 7, wherein part matrixes of the parity check matrix of the retransmission codeword are identity matrices, and include information corresponding to the retransmission codeword in the parity check matrix of the initial transmission codeword.

9. The decoding method of claim 6, further comprising:

setting the absolute value of reliability, which is a log likelihood ratio (LLR), of each of code-bits included in the output value of said channel decoding as infinite when it is determined that the channel decoding process is successfully performed.

10. A receiving apparatus for retransmission codeword decoding, said apparatus comprising:

a reliability searching unit for
calculating an absolute value of reliability of each of code-bits included in an output value of a channel decoding performed on a codeword received from a transmitting apparatus, when the channel decoding is determined to be unsuccessful, and identifying one or more code-bits in the output value with the respective absolute value(s) smaller than a predetermined reference value; and a receiving controller for generating retransmission feedback information requesting data retransmission of the identified code-bits, and transmitting the retransmission feedback information to the transmitting apparatus.

11. The receiving apparatus of claim 10, wherein, when the received codeword is a retransmission codeword rather than an initial transmission codeword, the receiving apparatus performs the channel decoding on the retransmission codeword using a new matrix configured by combining a part of a parity check matrix used in the initial transmission codeword in a parity check matrix of the retransmission codeword.

12. The receiving apparatus of claim 11, wherein the receiving apparatus performs the channel decoding on the retransmission codeword using a new log likelihood ratio (LLR) configured by adding the LLRs of the initial transmission and retransmission codewords.

* * * * *